US010152434B2

(12) United States Patent
Kyrychynskyi et al.

(10) Patent No.: US 10,152,434 B2
(45) Date of Patent: Dec. 11, 2018

(54) EFFICIENT ARBITRATION FOR MEMORY ACCESSES

(71) Applicants: Advanced Micro Devices, Inc., Sunnyvale, CA (US); ATI Technologies ULC, Markham (CA)

(72) Inventors: Rostyslav Kyrychynskyi, Toronto (CA); Anthony Asaro, Toronto (CA); Kostantinos Danny Christidis, Toronto (CA); Mark Fowler, Hopkinton, MA (US); Michael J. Mantor, Orlando, FL (US); Robert Scott Hartog, Windermere, FL (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 51 days.

(21) Appl. No.: 15/385,566

(22) Filed: Dec. 20, 2016

(65) Prior Publication Data

US 2018/0173649 A1    Jun. 21, 2018

(51) Int. Cl.
*G06F 13/14* (2006.01)
*G06F 13/16* (2006.01)
*G06F 13/36* (2006.01)
*G06F 13/40* (2006.01)

(52) U.S. Cl.
CPC ........ *G06F 13/161* (2013.01); *G06F 13/1673* (2013.01); *G06F 13/4068* (2013.01)

(58) Field of Classification Search
CPC .......... G06F 13/14; G06F 13/16; G06F 13/36; G06F 13/40
See application file for complete search history.

(56) References Cited

U.S. PATENT DOCUMENTS

| | | |
|---|---|---|
| 5,638,534 A | 6/1997 | Mote, Jr. |
| 5,721,860 A | 2/1998 | Stolt et al. |
| 5,745,913 A | 4/1998 | Pattin et al. |
| 5,802,597 A | 9/1998 | Nelsen |
| 5,987,574 A | 11/1999 | Paluch |
| 7,461,191 B2 | 12/2008 | Baer et al. |
| 7,844,758 B1 | 11/2010 | Hughes |
| 2003/0233503 A1* | 12/2003 | Yang ................ G06F 13/1663 710/100 |
| 2014/0201471 A1* | 7/2014 | Cutter ............... G06F 13/1663 711/151 |
| 2016/0188529 A1* | 6/2016 | Nagarajan .......... G06F 12/0813 711/151 |

* cited by examiner

*Primary Examiner* — David E Martinez
(74) *Attorney, Agent, or Firm* — Meyertons Hood Kivlin Kowert and Goetzel PC; Rory D. Rankin (57) ABSTRACT

A system and method for efficient arbitration of memory access requests are described. One or more functional units generate memory access requests for a partitioned memory. An arbitration unit stores the generated requests and selects a given one of the stored requests. The arbitration unit identifies a given partition of the memory which stores a memory location targeted by the selected request. The arbitration unit determines whether one or more other stored requests access memory locations in the given partition. The arbitration unit sends each of the selected memory access request and the identified one or more other memory access requests to the memory to be serviced out of order.

17 Claims, 4 Drawing Sheets

EFFICIENT ARBITRATION FOR MEMORY ACCESSES

BACKGROUND

Description of the Relevant Art

Computing systems include one or more functional blocks or units, each capable of accessing memory for data. As the functionality of smartphones, tablet computers, multimedia players and so forth increase, the demand for more data to process also increases. The computing systems use a relatively large amount of low-cost main memory as the next level of a memory hierarchy after smaller, faster and more expensive cache memories. In many examples, the main memory is dynamic random-access memory (DRAM). Most software applications that access a lot of data are memory bound in that computation time is generally determined by memory bandwidth. A memory access latency for an off-chip DRAM reaches hundreds to over a thousand clock cycles. An increased number of cores in processor designs has accentuated the memory bandwidth problem.

Part of a DRAM access includes at least an activation or opening stage, a tag comparison stage, and a precharge or closing stage. During the opening stage, the contents of an entire row are copied into the row buffer. When access requests target different rows, the opening and closing stages are repeated, which increase access latency. Each request sent from one of the multiple functional units in the computing system includes overhead processing and information retrieval processing. The repeated opening and closing stages for DRAM access increases the information retrieval processing. A large number of requests incurring the lengthened DRAM access latency reduces the memory subsystem performance.

In view of the above, methods and mechanisms for efficient arbitration of memory access requests are desired.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Further, it will be appreciated that for simplicity and clarity of illustration, elements shown in the figures have not necessarily been drawn to scale. For example, the dimensions of some of the elements are exaggerated relative to other elements.

Systems and methods for efficient arbitration of memory access requests are contemplated. In various embodiments, a computing system includes one or more requestors generating memory access requests for data stored in memory. In various embodiments, the one or more requestors include functional blocks or units within processor cores. The processor cores are included within one or more of a general-purpose central processing unit (CPU) and a highly parallel data architecture processor such as a graphics processing unit (GPU), a digital signal processor or other. An arbitration unit receives the generated memory access requests and reorders them for efficient out-of-order servicing. The arbitration unit sends the reordered memory access requests to the memory controller coupled to the memory.

In various embodiments, the memory of the computing system is partitioned into banks. In some embodiments, the arbitration unit includes a separate arbiter for each bank, and further arbitration logic rotates (e.g., round robin) among the banks for sending one or more reordered memory access requests to the memory controller. The rotating includes selection based on a round robin scheme, a priority scheme, an age scheme, a combination, or other. Each arbiter stores received memory access requests and selects a given one of the stored requests. In various embodiments, the selected request is the oldest stored request. In other embodiments, selection is based on an algorithm using a combination of one or more of a monitored age, a priority level, a quality-of-service parameter, a source identifier (ID), an application ID and so forth.

The arbiter identifies a given partition of the memory which stores a memory location targeted by the selected request. In various embodiments, the memory is a dynamic random access memory (DRAM) used as main memory. Accesses of the DRAM cause the contents of a row of the DRAM to be copied into a row buffer. In some embodiments, each bank is further divided into partitions the size of the row. For example, in various embodiments, each row is a page such as a 4 kilobyte (KB) contiguous storage of data. Other page sizes are possible and contemplated.

The arbiter determines whether one or more other stored requests access memory locations in the given page storing the memory location targeted by the selected request. In some embodiments, the arbiter selects a subset of stored requests to search. For example, in some embodiments, the subset includes a given number of the oldest requests of the stored requests. In other embodiments, the subset includes a given number of requests with a highest ranking of the stored requests. Similar to the selection of the given request, the ranking of the stored requests is based on an algorithm using a combination of one or more of a monitored age, a priority level, a quality-of-service parameter, a source identifier (ID), an application ID and so forth.

When the arbiter finds one or more other memory access requests of the stored requests targeting memory locations within the given page storing the memory location targeted by the selected request, the arbiter sends each of the selected memory access request and the identified one or more other memory access requests to the memory controller to be serviced out of order.

In various embodiments, the sending of the requests to the memory controller completes an arbitration cycle. Another arbitration cycle begins with the bank arbiter storing received requests, selecting a given request of the stored request, identifying a given page of the memory storing a memory location targeted by the given request and searching the other requests for requests also targeting memory locations within the given page.

Figure 1:
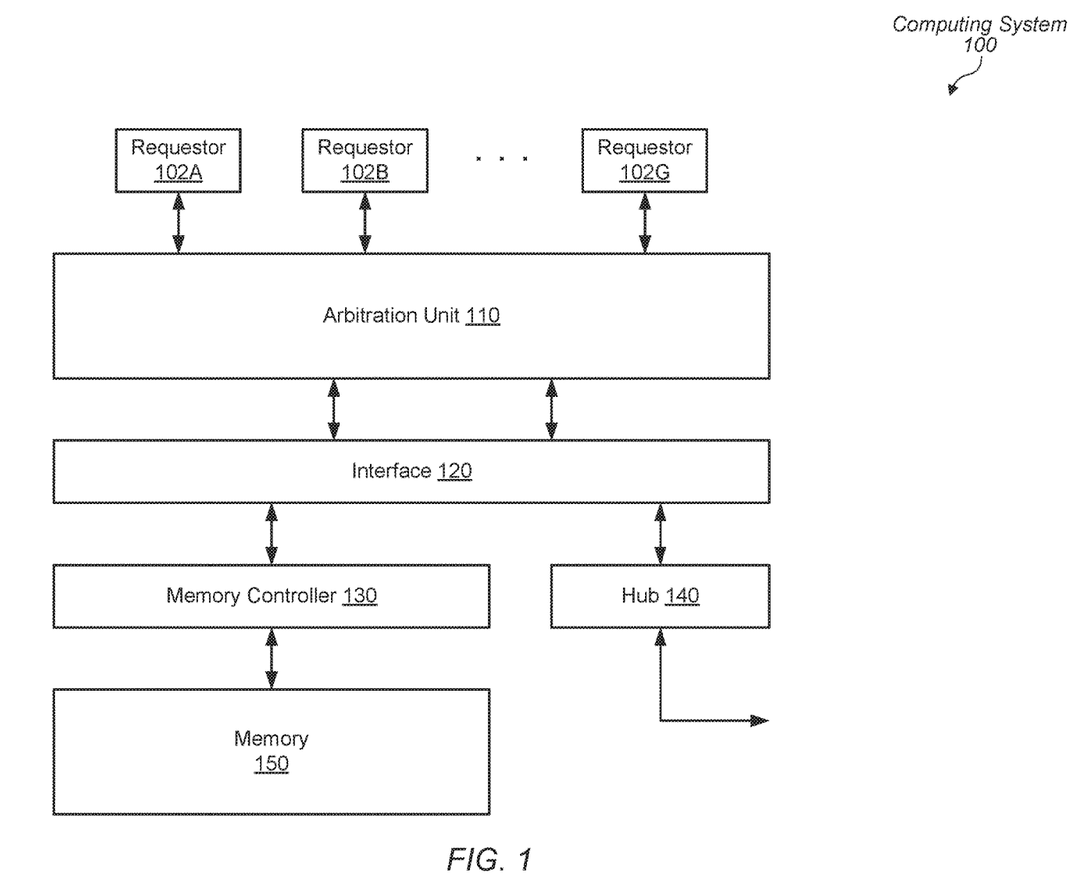
FIG. 1 is a generalized diagram of one embodiment of a computing system.

Turning to FIG. 1, a generalized block diagram of one embodiment of a computing system 100 is shown. The computing system 100 includes requestors 102A-102G, arbitration unit 110, interface 120, memory controller 130, hub 140 and memory 150. Each of the requestors 102A-102G is capable of generating memory access requests for data stored in the memory 150. In various embodiments, each of the requestors 102A-102G is a functional block or unit within a processor core. The computing system 100 includes one or more of a general-purpose CPU and a highly parallel data architecture processor such as a GPU. The one or more CPUs and GPUs include the one or more processor cores comprising the requestors 102A-102G.

In some embodiments, the requestors 102A-102G are individual dies on an integrated circuit (IC), such as a system-on-a-chip (SOC). In other embodiments, the requestors 102A-102G are individual dies within a package, such as a multi-chip module (MCM). In yet other embodiments, the requestors 102A-102G are individual dies or chips on a printed circuit board. In various embodiments, the requestors 102A-102G are used in a smartphone, a tablet computer, a gaming console, a smartwatch, a desktop computer and so forth.

In various embodiments, the interface 120 is a communication fabric used for transmitting traffic back and forth between the requestors 102A-102G and the memory 150 via the memory controller 130 in addition to input/output (I/O) devices via the hub 140. The interface 120 includes control logic, status and control registers and other storage elements for queuing requests and responses, storing control parameters, following one or more communication and network protocols, and efficiently routing traffic between sources and destinations on one or more buses. The hub 140 additionally includes control logic and storage elements for handling traffic with one or more I/O devices according to appropriate protocols.

The memory controller 130 is used to control access to the memory 150. The memory controller 130 includes queues for storing requests and responses. Additionally, the memory controller 130 includes control logic for grouping requests to be sent to the memory 150, sending the requests based on timing specifications of the memory 150 and supporting any burst modes. The memory controller 130 also includes status and control registers for storing control parameters. Similar to the interface 120 and the hub 140, the memory controller 130 includes hardware circuitry and/or software for implementing algorithms to provide its desired functionality. In various embodiments, the memory 150 is DRAM and the memory controller 130 is a DRAM controller.

In various embodiments, the memory 150 is partitioned. For example, in various embodiments, the memory 150 is DRAM partitioned into banks, each bank further partitioned into pages. Each page stores multiple memory storage locations. In some embodiments, a page is 4 kilobytes (KB) of contiguous storage of data. However, other page sizes are possible and contemplated. As used herein, the term "access" refers to performing a read access request or a write access request of data corresponding to a specified memory address. In various embodiments, an up-to-date (most recent) copy of the data is brought from the memory 150 into one or more levels of a cache memory subsystem of a functional unit corresponding to one of the requestors 102A-102G. Based on the instructions being processed by the functional unit, the functional unit updates the copy of the data and now contains the up-to-date (most recent) copy of the data. Alternatively, the functional unit does not modify the data retrieved from memory 150, but uses it to process instructions of one or more applications and update other data.

At a later time, the functional unit fills its cache memory subsystem with other data as it processes instructions of other applications and evicts the particular data stored at the specified memory address. The copy of the data is returned from the corresponding one of the requestors 102A-102G to the memory 150 by a write access request to update the stored copy in the memory 150. The requestors 102A-102G include high-speed cache memories configured to store blocks of data. For example, in various embodiments, the requestors 102A-102G include static random access memory (SRAM) for the cache memory subsystem. As used herein, a "block" retrieved, used and modified by the requestors 102A-102G is a set of bytes stored in contiguous memory locations, which are treated as a unit for coherency purposes. As used herein, each of the terms "cache block", "block", "cache line", and "line" is interchangeable. In some embodiments, a block is the unit of allocation and deallocation in a cache. One of a variety of a number of bytes is used for the block size and the number is selected according to design choice. In addition, each of the terms "cache tag", "cache line tag", and "cache block tag" is interchangeable.

In various embodiments, the memory 150 includes row buffers for storing the contents of a row of DRAM being accessed. An access of the memory 150 includes a first activation or an opening stage followed by a stage that copies the contents of an entire row into a corresponding row buffer. Afterward, there is a read or write column access in addition to updating related status information.

As described earlier, in various embodiments, the memory 150 includes multiple banks. Each one of the banks includes a respective row buffer. Each one of the row buffers stores data in an accessed row of the multiple rows within the banks of the memory 150. The accessed row is identified by an address, such as a DRAM page address, in the received memory access request from one of the requestors 102A-102G. In various embodiments, the row buffer stores a page of data.

If a subsequent memory access request accesses data stored in the same row buffer which is currently open, then there is no closing stage yet as the same row is accessed for the subsequent read or write access request. When the subsequent memory access request does not access data stored in the currently open row stored in the row buffer within the memory 150, a precharge or closing stage occurs for the data in the row buffer, a second activation or opening stage occurs followed by a stage that copies again the contents of the entire currently targeted row into the row buffer. Afterward, another column access occurs, and another possible update stage for status information is performed. Therefore, it is more efficient to group memory access requests targeting memory locations stored in a same row within the memory 150. When the row buffer is able to store an entire page, it is more efficient to group memory access requests targeting memory locations within the same page of the memory 150. At least the closing and reopening stages along with the other stages listed above performed between accesses is avoided.

The arbitration unit 110 receives the generated memory access requests from the requestors 102A-102G. In some embodiments, the arbitration unit 110 stores the received memory access requests before sending them to the memory controller 130. The arbitration unit 110 reorders the received memory access requests for efficient out-of-order servicing. The arbitration unit 110 sends the reordered memory access requests to the memory controller 130 coupled to the memory 150.

In various embodiments, the arbitration unit 110 includes one or more queues for storing received memory access requests, status and control registers for storing control parameters, and control logic for reordering the received memory access requests for efficient out-of-order servicing. The functionality of the arbitration unit 110 is implemented by hardware circuitry and/or software. In various embodiments, the arbitration unit 110 finds memory access requests targeting memory locations within a same page of the memory 150 and sends these found memory access requests as a group to the memory controller 130 for out-of-order servicing. Therefore, the penalty for memory access requests targeting memory locations in different pages of the memory 150, which includes at least closing an already open page stored in a row buffer and opening another row, is avoided.

Similar to the memory controller 130, in some embodiments, control logic within the arbitration unit 110 is aware of the timing specifications of the memory 150 and any supported burst modes. Therefore, the arbitration unit 110 schedules the sending of the selected memory access requests to the memory controller 130 in a particular manner based on the timing specifications, any supported burst modes and so forth. The subsequent scheduling also further reorders the selected memory access requests.

In one example, the arbitration unit 110 is aware the memory 150 is partitioned into banks and further the banks are grouped. The memory 150 is partitioned into 16 banks and a first bank group includes 8 banks and a second bank group includes the other 8 banks. Another number of bank groups and a number of banks within a group are possible and contemplated. In various embodiments, the accesses of the two bank groups include non-overlapped timing windows. In other embodiments, the accesses follow a pattern where the first bank group is accessed for two or more access cycles before the second bank group is accessed for two or more access cycles. In various embodiments, the number of access cycles changes during each switch between the bank groups or after each of the two bank groups have been accessed.

The pattern, the length of the access cycle, the number of bank groups and the number of banks within a bank group can each vary and be any value deemed efficient for the technology used to implement the memory 150. Knowledge of the organization and timing specifications used for the memory 150 is known to the arbitration unit 110, which reorders the selected memory access requests based on this knowledge. As the technology and schemes change for the memory 150, the reordering by the arbitration unit 110 also changes to reduce penalties and increase efficiency. For example, in various embodiments, the arbitration unit 110 includes programmable control registers and/or control logic to adapt algorithms used for reordering the selected memory access requests based on the characteristics of the memory 150.

In various embodiments, the computing system 100 utilizes pseudo channel techniques when transferring requests and responses to and from the memory 150. The memory controller 130 supports multiple independent memory access transactions over a common physical channel by multiplexing the different transactions onto the single physical channel. The pseudo channels may also referred to as virtual channels. In various embodiments, the memory 150 supports double data rate synchronous DRAM with independent sub-channels. In some embodiments, the independent sub-channels are used in an architecture supporting the LPDDR4 specification. In some embodiments, the memory controller 130 and the memory 150 support the sub-channels transferring distinct but temporally aligned data and clocking control signals.

When the memory controller 130 and the memory 150 support the use of pseudo channels or independent sub-channels, the arbitration circuit (or arbitration unit) 110 again adapts the reordering of the selected memory access requests based on the corresponding technique to reduce penalties and increase efficiency. As further described later, the selection of the memory access requests based on age or another ranking system both reduces the number of page conflicts within the memory 150 and reduces the penalty of page conflicts. The subsequent reordering of the selected memory access requests based on the memory channel techniques, such as the pseudo channel technique or the independent sub-channels technique, and the storage technology used for the memory 150 further reduces penalties and increases memory subsystem performance.

Figure 2:
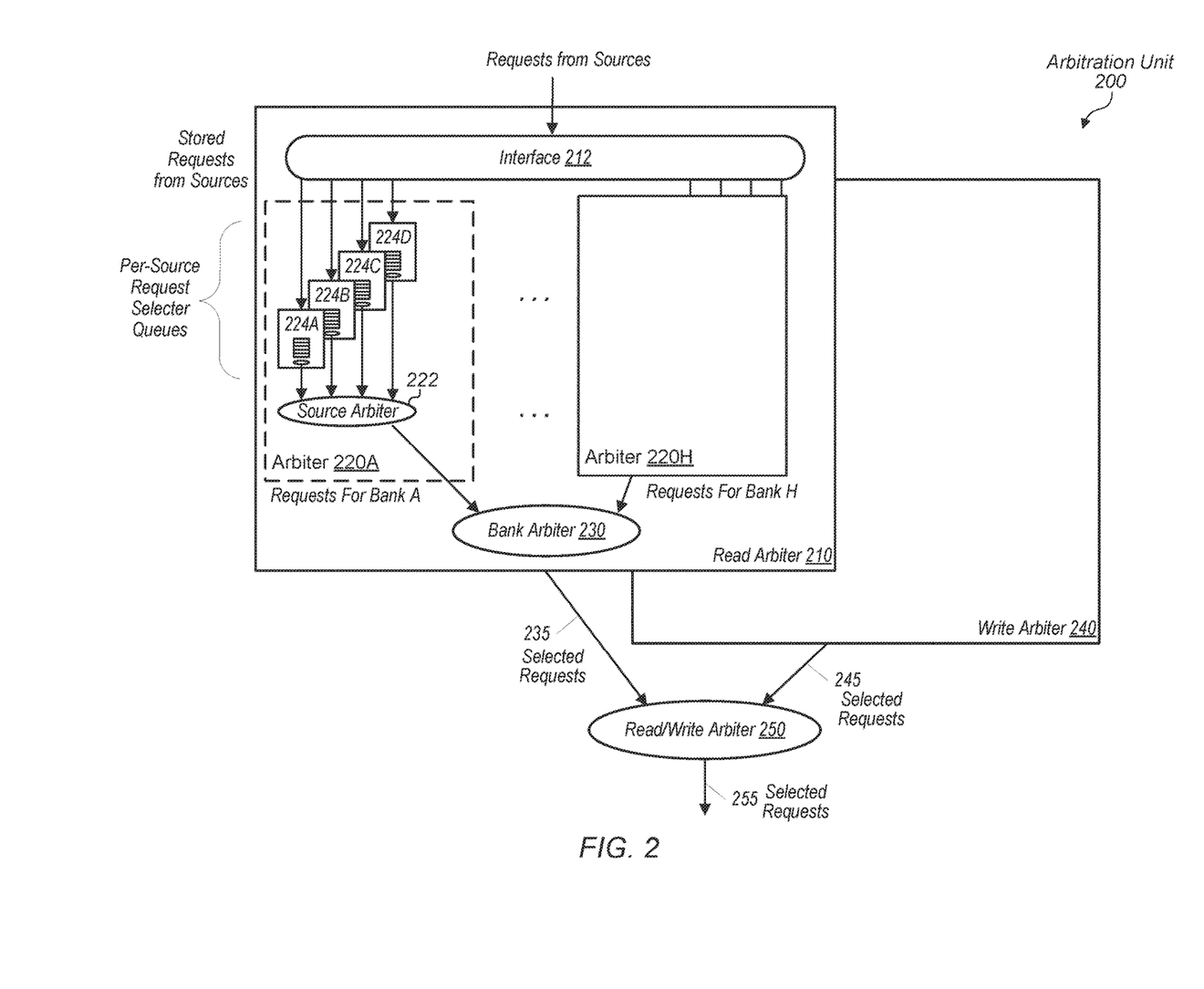
FIG. 2 is a generalized diagram of one embodiment of a memory access arbitration unit.

Referring now to FIG. 2, one embodiment of a memory access arbitration unit 200 (also referred to as an arbitration circuit) is shown. In the illustrated embodiment, the arbitration unit 200 includes a read arbiter 210 for reordering received memory read requests and a write arbiter 240 for reordering received memory write requests. In various embodiments, the read arbiter 210 finds read access requests targeting memory locations within a same page of memory, and the write arbiter 240 finds write access requests targeting memory locations within a same page of memory. The read/write arbiter 250 receives both selected requests 235 from the read arbiter 210 and selected requests 245 from the write arbiter 240. The read/write arbiter 250 selects between the received requests 235 and 245 and provides the chosen requests as selected requests 255 for further function units such as a memory controller.

In various embodiments, each of the read arbiter 210 and the write arbiter 240 shares the same functionality but receive requests corresponding to the different read access and write access operations, respectively. In other embodiments, the read access operations and the write access operations are placed in a same arbiter. As shown, the read arbiter 210 includes the interface 212 for receiving memory access requests. In various embodiments, many different requestors generate the memory access requests to access data stored in memory locations within different partitions of a partitioned memory. As described earlier, in various embodiments, the memory is partitioned into banks, and each bank is further partitioned into pages. Each page stores multiple memory locations such as cache lines.

Each of the arbiters 220A-220H receives memory access requests from the interface 212. In various embodiments, each of the arbiters 220A-220H is used for a corresponding one of the multiple banks in the partitioned memory. In such embodiments, the arbiter 220A receives memory access requests targeting memory locations in a first bank of the partitioned memory. The arbiter 220H receives memory access requests targeting memory locations in a second bank different from the first bank of the partitioned memory, and so on. The bank arbiter 230 receives selected requests from each of the arbiters 220A-220H. The bank arbiter 230 selects between the received requests and provides the chosen requests as selected requests 235 for the read/write arbiter 250.

In the illustrated embodiment, the arbiter 220A includes multiple request selector queues 224A-224D, each of which includes associated control logic circuitry. In various embodiments, each of the request selector queues 224A-224D is used for a corresponding one of the multiple requestors or sources generating memory access requests. Therefore, the memory access requests generated by the different requestors are not interleaved. However, in other embodiments, the prediction is unknown or provides a relatively low chance for accesses of different pages. In these cases, the memory access requests generated by the different requestors are interleaved.

In various embodiments, the ability to interleave or prevent interleaving of memory access requests from different requestors is programmable by updating control and status registers (not shown) in the arbiter 220A. When each of the request selector queues 224A-224D is used for a corresponding one of the requestors in the computing system, the request selector queue 224A receives memory access requests generated by a first requestor in the computing system. The request selector queue 224B receives memory access requests generated by a second requestor different from the first requestor in the computing system, and so on.

In various embodiments, each of the request selector queues 224A-224D includes logic (e.g., circuitry) configured to identify memory access requests from a corresponding requestor targeting memory locations within a same page of the partitioned memory. The particular page is chosen based on one of a variety of methods. For example, in some embodiments, control logic (not shown) for each of the request selector queues 224A-224D selects a given one of the stored requests. In various embodiments, the selected request is the oldest stored request. In other embodiments, selection is based on an algorithm using a combination of one or more of a monitored age, a priority level, a quality-of-service parameter, a source identifier (ID), an application ID and so forth. In some embodiments, a ranking system is used to sort the requests and the stored request with the highest ranking based on the algorithm is selected.

The memory location targeted by the selected request is identified. The corresponding page within the partitioned memory containing the targeted memory location is identified. For example, in some embodiments, a page address for a DRAM is identified. In other embodiments, a hash value is computed using the page address and one or more of a source identifier (ID), an application ID, a program counter (PC) value of an instruction being processed by the source, and so forth. The hash value is identified in such embodiments. Following, one or more other stored requests are found targeting memory locations within the same page or storing a same hash value. For each of the request selector queues 224A-224D, both the selected request and the one or more other found requests are sent to the source arbiter 222 for out-of-order servicing by a later functional unit such as a memory controller.

The source arbiter 222 receives selected requests from each of the request selector queues 224A-224D. The source arbiter 222 selects between the received requests and provides the chosen requests as selected requests for the bank arbiter 230. Each of the source arbiter 222, the bank arbiter 230 and the read/write arbiter 250 rotates among received requests for selection based on a round robin scheme, a priority scheme, an age scheme, or a combination computed by an algorithm. In addition, one or more of the arbiters 222, 230 and 250 use programmable to operate in a burst mode for multiple access requests accessing the same page. Therefore, rotation among the received requests based on the chosen algorithm waits until the bursting operation completes.

Figure 3:
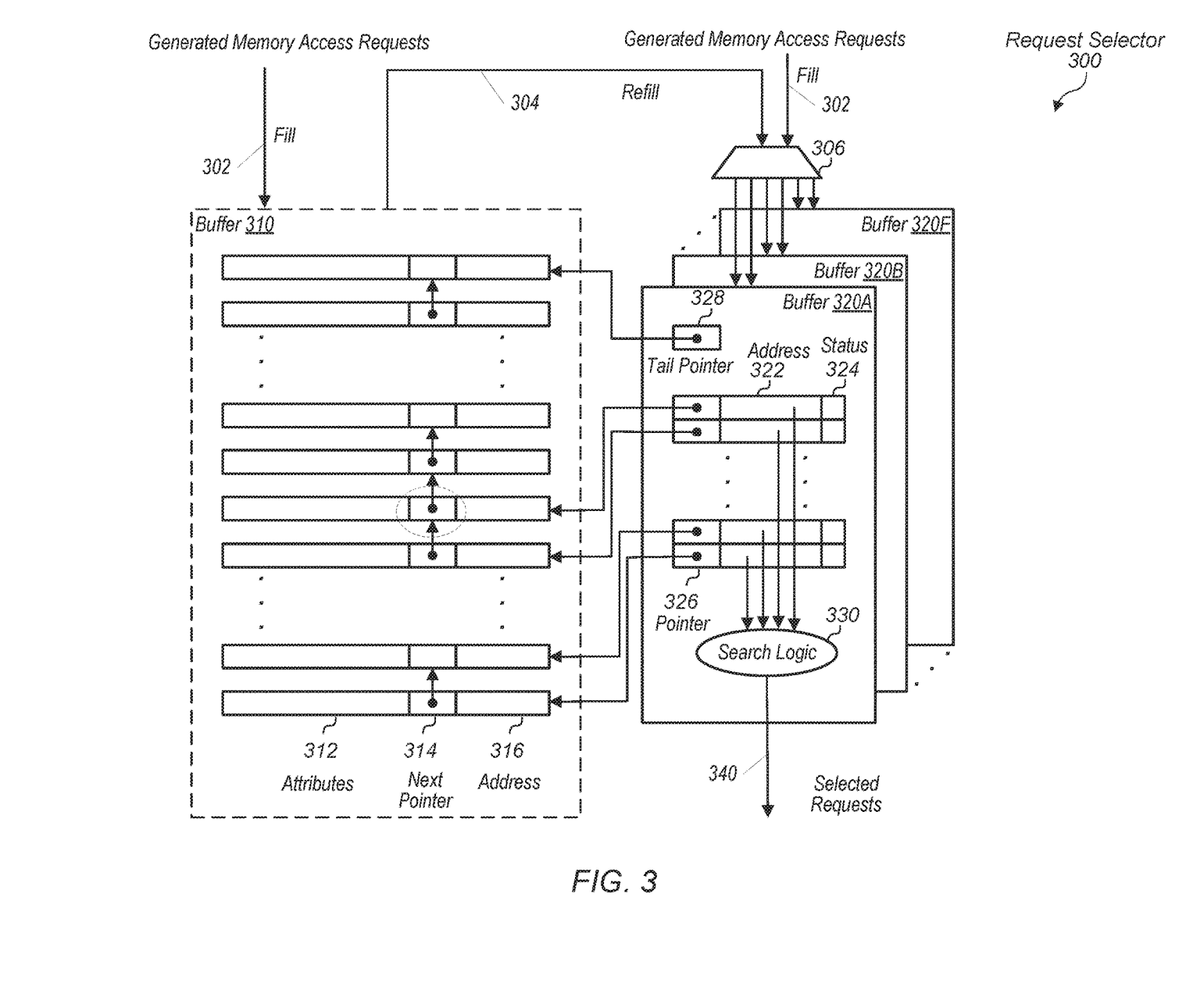
FIG. 3 is a generalized diagram of another embodiment of a memory access arbiter.

Referring now to FIG. 3, one embodiment of a memory access request selector 300 is shown. The request selector 300 includes the buffer 310. In some embodiments, the request selector 300 includes another single buffer 320A. In such embodiments, the single buffer 320A is used to search a subset of memory access requests stored in the buffer 310. In other embodiments, the request selector 300 includes multiple other buffers 320A-320F. In such embodiments, the multiple other buffers 320A-320F are used to search multiple subsets of memory access requests stored in the buffer 310 based on criteria. The criteria includes a source identifier (ID) of the requestor generating memory access requests, a memory access type, a priority level or other.

Generated memory access requests are received on input 302 and stored in the buffer 310. In some embodiments, the requests received on input 302 are from a single requestor or source. In such embodiments, the requests stored in the buffer 310 are not interleaved with requests from other sources. In other embodiments, the requests received on input 302 are from multiple sources. In such embodiments, the requests stored in the buffer 310 are interleaved with requests from other sources. As described earlier, the ability to interleave or prevent interleaving of memory access requests from different requestors is programmable by updating control and status registers (not shown).

As shown in the illustrated embodiment, each entry of the multiple entries in the buffer 310 includes an attributes field 312, a next pointer field 314 and an address field 316. The attributes field 312 stores a variety of information associated with a corresponding memory access request. For example, in various embodiments, the attributes field 312 stores one or more of a source ID, an application ID, a cache tag, a priority level, a quality-of-service parameter, and so forth. In addition, status information such as a valid bit, an entry or position number, and so forth, is stored in the attributes field 312. Alternatively, the status information is stored in a separate field (not shown).

The next pointer field 314 stores an indication of an entry or position in the buffer 310 for storing a next memory access request received after the memory access request corresponding to the entry. The next entry or position in the buffer 310 can be allocated or available depending on whether a next memory access request was already received. The indication stored in the next pointer field 314 provides in-order allocation of the entries in the buffer 310 based on the order the memory access requests are received on the input 302.

In some embodiments, the page address field 316 stores a DRAM page address of partitioned memory to be accessed by the stored memory access requests. In other embodiments, the field 316 stores a hash value. As described earlier, the hash value is computed using the page address and one or more of a source identifier (ID), an application ID, a program counter (PC) value of an instruction being processed by the source, and so forth.

In various embodiments, the request selector 300 is used to select a stored memory access request of the requests stored in the buffer 310 and identify one or more other stored requests storing a same field such as the field 316 holding a page address, a hash value or other. When determining whether any other stored request also includes a same value in the field 316, control logic (not shown) within the request selector 300 searches the requests. Rather than search the buffer 310 as it can store an appreciable number of entries, the request selector 300 searches a subset of the requests stored in the buffer 310. The subset(s) are stored in the buffers 320A-320F.

The selector 306 determines whether the buffers 320A-320F are filled from the memory access requests on the input 302 or from the buffer 310. For example, when the buffer 320A stores a subset of the oldest requests in the buffer 310, the buffer 320A is initially filled from the input 302. When the buffer 320A becomes full and later creates available entries by sending requests on output 340, the buffer 320A receives requests from the buffer 310. Therefore, the buffer 320A holds a number N of the oldest requests in the buffer 310 where N is an integer less than a total number M of the entries in the buffer 310. For example, in one embodiment, the buffer 310 holds 64 entries for storing 64 requests and the buffer 320A holds 16 entries for storing the 16 oldest requests in the buffer 310. In other embodiments, a ranking system is used as described earlier, and one or more of the buffers 320A-320F holds 16 entries for storing the 16 requests in the buffer 310 with the highest ranking.

In various embodiments, each entry of the buffer 320A stores a subset of the information stored in a corresponding entry in the buffer 310. As shown in the illustrated embodiment, each entry of the multiple entries in the buffer 320A includes an address field 322, a status field 324 and a pointer field 326. In various embodiments, the field 322 stores the same information stored in the field 316 of the corresponding entry in the buffer 310. For example, the field 322 stores the same page address, the same hash value or other. The status field 324 stores status information such as a valid bit, an entry or position number, and so forth.

The pointer field 326 stores an indication of the corresponding entry in the buffer 310. For example, in some embodiments, the pointer field 326 stores an entry number. The tail pointer 328 stores an indication of the last in-order allocated entry in the buffer 310. In some embodiments, an indication of a next entry in the buffer 310 to read when an entry in the buffer 320A becomes available for allocation is found by using both the pointer field 326 of the last allocated entry in the buffer 320A and the next pointer field 314 in the buffer 310 of the entry identified by pointer field 326 of the last allocated entry in the buffer 320A. In one example, the indication of the next entry in the buffer 310 to read is shown as being stored in the next pointer field 314 that is circled by the dashed ellipse. In other embodiments, the indication is stored in a refill pointer (not shown) within the buffer 320A. With this indication, it is possible to allocate entries in the buffer 320A in-order according to an age or a ranking. For example, if the buffer 320A stores a subset of the 16 oldest entries in the buffer 310, and 4 entries in the buffer 320A are selected out-of-order to be sent to memory and are deallocated, then the refill pointer indicates the entry in the buffer 310 storing the $17^{th}$ oldest request in the buffer 310. The next pointer field 314 of the $17^{th}$ oldest request in the buffer 310 is used to find the $18^{th}$ oldest request in the buffer 310. The next pointer field 314 of the $18^{th}$ oldest request in the buffer 310 is used to find the $19^{th}$ oldest request in the buffer 310, and so on. The information stored in the entries of the buffer 310 corresponding to the found $17^{th}$ to the $20^{th}$ oldest requests are used to allocate the 4 available entries in the buffer 320A.

As described earlier, during each arbitration cycle, control logic selects an entry in the buffer 320A based on age, a highest ranking or other. In various embodiments, the entries in the buffer 320A are filled from the bottom with the oldest or highest ranking request allocating the bottom entry. In other embodiments, the top entry is used. In various embodiments, the entries of the buffer 320A are implemented as a content addressable memory (CAM) and the contents of the entries collapse or shift when entries are deallocated. Therefore, the oldest or highest ranking request is always stored at the bottom (or top) of the buffer 320A.

When the oldest or highest ranking request is selected, the field 322 is inspected for the address, hash value or other that it stores. This value is used to search the other entries of the buffer 320A. For example, in various embodiments, the search logic 330 performs a CAM match operation using the identified value to find whether one or more other requests with entries in the buffer 320A also store the identified value. The selected request at the bottom (or top) of the buffer 320A and the one or more other found requests are sent on the output 340 to the memory controller. In some embodiments, these requests are sent to one or more other levels of arbitration logic before arriving at the memory controller.

Entries in the buffer 320A corresponding to the selected request and the one or more other found requests are deallocated from the buffer 320A and the entries are collapsed or shifted. The available entries are allocated with information of other requests either from the buffer 310 or the input 302. If the information is from the buffer 310, then as described earlier, either the refill pointer or a combination of the pointer fields 326 and 314 is used to identify the first entry to read from the buffer 310. It is noted the values stored in the next pointer field 314 of the buffer 310 are not updated when entries are deallocated from each of the buffer 320A and the buffer 310. Therefore, the linked list styled storage in the buffer 310 is not re-stitched when intermediate links are removed.

The prevention of updating the next pointer field 314 causes no issues as the next pointer field 314 is only used when allocating available entries in the buffer 320A or when updating the refill pointer if a refill pointer is used. The information in an entry of the buffer 310 is used to allocate a corresponding entry in the buffer 320A, and find the next entry in the buffer 310 to use for allocating a next entry in the buffer 320A. Following allocation of entries in the buffer 320A and/or updating the refill pointer, the value stored in the next pointer field 314 is not used again.

Figure 4:
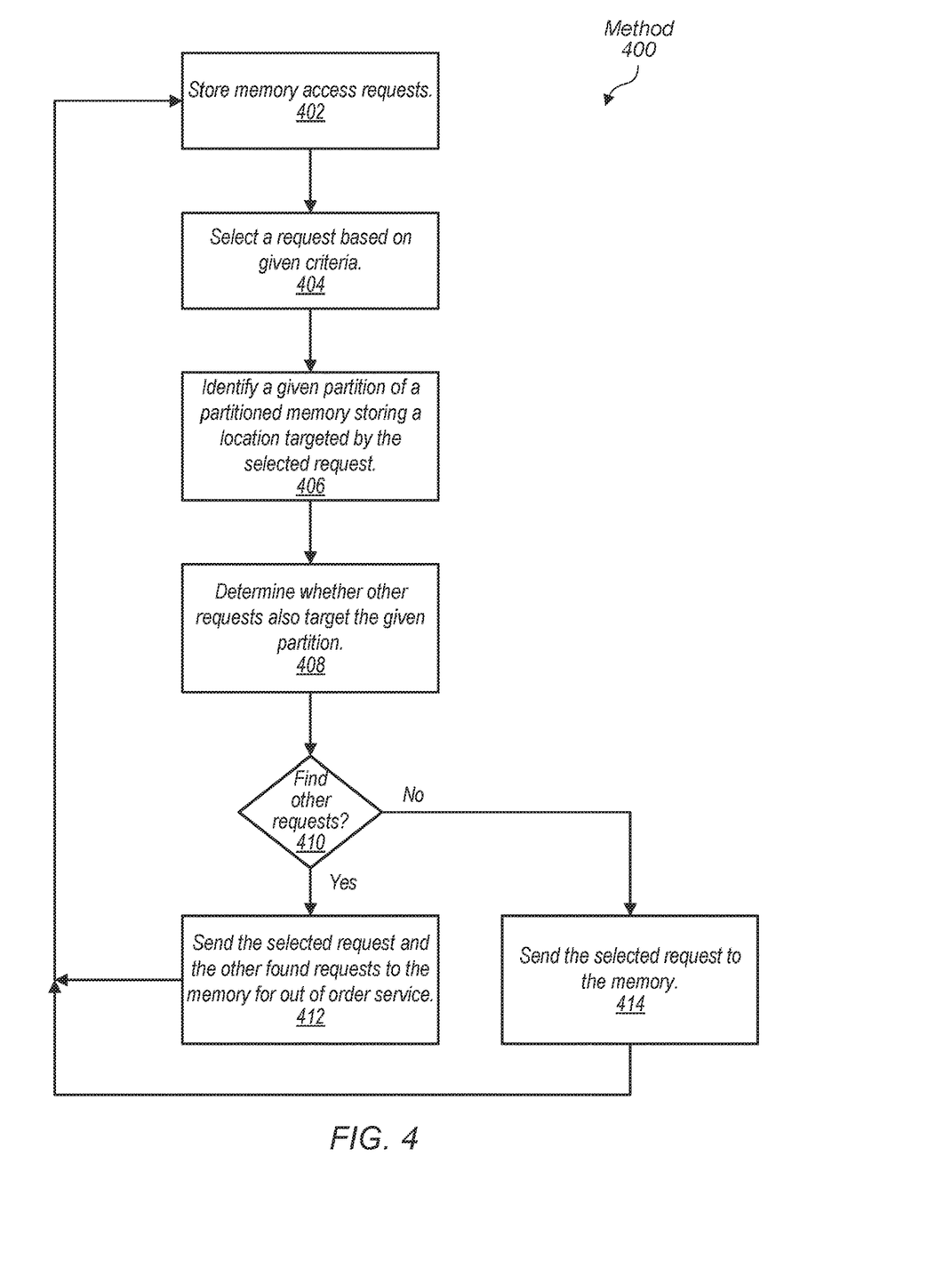
FIG. 4 is a generalized diagram of one embodiment of a method for memory access request arbitration.

Referring now to FIG. 4, one embodiment of a method 400 for memory access request arbitration is shown. For purposes of discussion, the steps in this embodiment are shown in sequential order. However, in other embodiments some steps occur in a different order than shown, some steps are performed concurrently, some steps are combined with other steps, and some steps are absent.

One or more functional units process instructions of one or more computer programs, or software applications. As described earlier, the functional units are within processor cores used for a variety of data processing. During processing, the functional units generate memory access requests for a partitioned memory. In various embodiments, the memory is partitioned into banks. Each bank is further divided into partitions the size of a row used in DRAM. In various embodiments, each row is a page such as a 4 kilobyte (KB) contiguous storage of data. Other page sizes are possible and contemplated. Each page includes multiple memory storage locations accessed by the functional units. In various embodiments, the generated memory access requests are received, such as by an arbitration unit, and stored (block 402).

One of the stored requests is selected based on given criteria (block 404). In various embodiments, the selected request is the oldest stored request. In other embodiments, selection is based on an algorithm computing a ranking system to sort the stored requests. The ranking is based on a combination of one or more of a monitored age, a priority level, a quality-of-service parameter, a source identifier (ID), an application ID and so forth. The stored request with the highest ranking based on the algorithm is selected.

A given partition of the partitioned memory stores a memory location targeted by the selected request. The given partition is identified (block 406). For example, in some embodiments, a DRAM page address corresponding to the selected request is found in a queue entry storing data associated with the selected request. In other embodiments, a hash value corresponding to the selected request is found and used. As described earlier, a hash value is computed using the page address and one or more of a source identifier (ID), an application ID, a program counter (PC) value of an instruction being processed by the source, and so forth.

It is determined whether one or more other stored memory access requests also store the same indication as the selected request (block 408). For example, a search is performed to determine whether one or more other stored requests store the same page address, the same hash value, or other. If no other requests are found ("no" branch of the conditional block 410), then the selected request is sent to memory (block 414). If other requests are found ("yes" branch of the conditional block 410), then the selected request and the other found requests are sent to the memory for out of order service (block 412). In various embodiments, prior to being received at a memory controller corresponding to the partitioned memory, the request(s) being sent to memory traverse one or more levels of arbitration logic based on one or more of sources generating memory access requests, the banks of the partitioned memory, the pages of the partitioned memory, the type of the memory access operation, and so forth.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a first requestor and a second requestor configured to send memory access requests;
a memory comprising a plurality of partitions;
a memory controller coupled to the memory; and
an arbitration circuit comprising an interface, wherein the arbitration circuit is configured to:
receive a plurality of memory access requests from the first requestor and the second request via the interface;
select a given memory access request of the plurality of memory access requests, wherein the given memory access request targets a memory location within a given partition of the plurality of partitions;
identify one or more other memory access requests of the stored plurality of memory access requests targeting memory locations within the given partition, wherein to identify the one or more other memory access requests the arbitration circuit is configured to determine the one or more memory access requests are an oldest subset of N memory access requests of the plurality of memory access requests targeting memory locations within the given partition, wherein N is an integer greater than one and less than a total of the plurality of memory access requests; and
send the given memory access request and the identified one or more other memory access requests to the memory controller to be serviced out of order.

2. The computing system as recited in claim 1, wherein the given memory access request is selected based on determining the given memory access request is an oldest one of the plurality of memory access requests.

3. The computing system as recited in claim 1, wherein the arbitration circuit comprises a first buffer comprising a plurality of entries storing memory access requests as a linked list and a second buffer comprising a plurality of entries storing an identification of an oldest N memory access requests of the plurality of memory access requests.

4. The computing system as recited in claim 3, wherein each entry of the second buffer stores an identification of an entry in the first buffer.

5. The computing system as recited in claim 3, wherein in response to sending a memory access request of the one or more memory access requests to the memory controller, the arbitration circuit is further configured to deallocate entries in each of the first buffer and the second buffer without updating pointers in the linked list.

6. The computing system as recited in claim 1, wherein the plurality of memory access requests are received from the first requestor and second requestor, and wherein the arbitration circuit is further configured to:
store memory access requests from each of the first requestor and the second requestor in separate buffers; and
select one or more memory access requests to send to the memory controller based on a priority level of each of the first requestor and the second requestor.

7. The computing system as recited in claim 1, wherein the memory comprises a plurality of banks each comprising a subset of the plurality of partitions, and wherein the arbitration circuit is further configured to rotate among the plurality of banks when sending one or more memory access requests to the memory controller.

8. A method for managing data in a memory system, the method comprising:
receiving a plurality of memory access requests;
selecting a given memory access request of the plurality of memory access requests for servicing, wherein the given memory access request targets a memory location within a given partition of a plurality of partitions in a memory;
identifying one or more other memory access requests of the stored plurality of memory access requests that target memory locations within the given partition, wherein identifying the one or more other memory access requests comprises determining the one or more memory access requests are an oldest subset of N memory access requests of the plurality of memory access requests targeting memory locations within the given partition, wherein N is an integer greater than one and less than a total of the plurality of memory access requests; and
sending the given memory access request and the identified one or more other memory access requests to a memory controller to be serviced out of order.

9. The method as recited in claim 8, further comprising selecting the given memory access request based on determining the given memory access request is an oldest one of the plurality of memory access requests.

10. The method as recited in claim 8, further comprising storing memory access requests as a linked list in a plurality of entries of a first buffer and storing an identification of an oldest N memory access requests of the plurality of memory access requests in a plurality of entries of a second buffer.

11. The method as recited in claim 10, wherein each entry of the second buffer stores identification of an entry in the first buffer.

12. The method as recited in claim 11, wherein in response to sending the one or more memory access requests to the memory controller, the method further comprises deallocating entries in each of the first buffer and the second buffer corresponding to the one or more memory access requests without updating pointers in the linked list.

13. The method as recited in claim 8, further comprising:
storing memory access requests from each of the first requestor and the second requestor in separate buffers; and
selecting one or more memory access requests to send to the memory controller based on a priority level of each of the first requestor and the second requestor.

14. The method as recited in claim 8, wherein the memory comprises a plurality of banks, each bank comprising a subset of the plurality of partitions, and wherein the method further comprises rotating among the plurality of banks when sending one or more access requests to the memory controller.

15. An arbiter comprising:
a first interface configured to receive memory access requests;
a second interface configured to convey memory access requests to a memory controller coupled to a memory comprising a plurality of partitions; and
a control unit configured to:
receive a plurality of memory access requests via the first interface;
select a given memory access request of the plurality of memory access requests, wherein the given memory access request targets a memory location within a given partition of the plurality of partitions;
identify one or more other memory access requests of the stored plurality of memory access requests targeting memory locations within the given partition, wherein to identify the one or more other memory access requests the arbitration circuit is configured to determine the one or more memory access requests are an oldest subset of N memory access requests of the plurality of memory access requests targeting memory locations within the given partition, wherein N is an integer greater than one and less than a total of the plurality of memory access requests; and
send the given memory access request and the identified one or more other memory access requests to the memory controller to be serviced out of order.

16. The arbiter as recited in claim 15, wherein the given memory access request is selected based on determining the given memory access request is an oldest one of the plurality of memory access requests.

17. The cache controller as recited in claim 15, wherein the control unit comprises a first buffer comprising a plurality of entries storing memory access requests as a linked list and a second buffer comprising a plurality of entries storing an identification of an oldest N memory access requests of the plurality of memory access requests.

* * * * *